3,274,293
CROSS-LINKED HALOGENOUS POLYESTER COMPOSITIONS PREPARED FROM ALKYLENE OXIDES AND MONOFUNCTIONAL HALOGENATED ALCOHOLS
Gunther Elfers, Grosse Ile, and Pauls Davis, Gibraltar, Mich., assignors to Wyandotte Chemicals Corporation, Wyandotte, Mich., a corporation of Michigan
No Drawing. Filed Dec. 28, 1964, Ser. No. 421,685
70 Claims. (Cl. 260—869)

The present invention relates to cross-linked polyester compositions, and is more particularly concerned with cross-linked halogenous polyester compositions which have a relatively high order of nonflammability and which, in many cases, are nonburning as well as self-extinguishing.

The commercial possibilities of polymeric materials based on polyesters were recognized during the 1930's and especially somewhat later during the war years. It was found that these polyester resins could be cast alone or with fibers and strands of synthetic and natural reinforcing materials such as glass fibers, nylon, cotton, sisal, asbestos, as well as many other materials, in fabric, mat, yarn, and chopped or continuous roving form, to give hard, durable lightweight structural materials. They could be applied to surfaces by spraying, roller-coating, dipping, brushing, or other suitable means to give tough, weather-resistant, thermosetting coatings. The ultrahigh strength properties of these compositions, combined with their light weight and durability, made them successful competitors for many applications with more conventional structural materials such as steel and aluminum. Many other valuable applications were also found, as in films which could be economically produced and advantageously used as wrapping materials.

However, in spite of the excellent physical and chemical properties of such polyester-based compositions, it was also found that they possess a major disadvantage, and consequently a factor which limits the area of their potential use: they are flammable and burn readily. Safety requirements, as imposed by insurance underwriters and civic ordinances, dictate that materials more resistant to fire be used.

It is a purpose of this invention to provide a new and useful class of cross-linked halogenous polyesters, having a high degree of resistance to chemicals and solvents and improved water absorption properties, which exhibit improved thermal properties which are prepared from commercially available materials, which are relatively inexpensive, which have a relatively high order of nonflammability, which, in many cases, are nonburning and which can be molded alone or with reinforcing materials to give hard, durable plastics, which may be used for a variety of purposes and to provide new and useful reaction products of such polyesters with isocyanates or acid chlorides.

It has now been found that the foregoing and additional objects are accomplished by the provision of novel ethylenically unsaturated halogenous polyesters which are cross-linked with ethylenically unsaturated cross-linking agents. The resulting polyester compositions are characterized by a relatively high order of nonflammability and chemical resistance, and in many cases are nonburning. By "nonburning" is meant that the polyester composition will not burn even when directly exposed to a flame. Depending on the reaction components and their ratios, the polyester resins range from soft and elastic to very hard materials, and may be used in almost all applications where polyester resins are currently used, but to give products having increased nonflammability and chemical resistance. For instance, they may be molded or cast with reinforcing materials of various kinds, such as natural and synthetic fibers, including glass fibers, nylon (polyamide and polyester), sisal, asbestos, cotton, etc., to give strong, durable laminates which have an extremely high degree of nonflammability. They may be applied to surfaces to give tough, weather-, fire-, and chemical-resistant coatings.

POLYESTERS

The ethylenically unsaturated polyesters used to prepare the cross-linked polyester compositions of the present invention are polyesters prepared by reacting (a) an ethylenically unsaturated organic dibasic acid anhydride or mixtures of the ethylenically unsaturated dibasic acid anhydride with a nonethylenically unsaturated dibasic acid anhydride (which is preferably free of other than aromatic unsaturation) with (b) one or more alkylene oxides, which may be halogenous alkylene oxides or mixtures of halogenous alkylene oxide with nonhalogenous alkylene oxide, which is preferably saturated or free from other than aromatic unsaturation and a halogenated monofunctional alcohol having the following general formula:

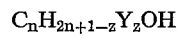

wherein $n$ is an integer of from 1 to 11, $z$ is an integer from 1 to 23, and Y is a halogen.

Essentially, the alkylene oxide reacts with the anhydride to give a polymer chain comprising alternating dicarboxy and oxyalkylene units, one or two or more of such oxyalkylene units being joined in the polymer chain depending on the reactants and ratio of reactants, the polymer chain being terminated by a halogenous monofunctional alcohol. Thus, the preferred polymeric products of the invention may, in general, be depicted by the formula:

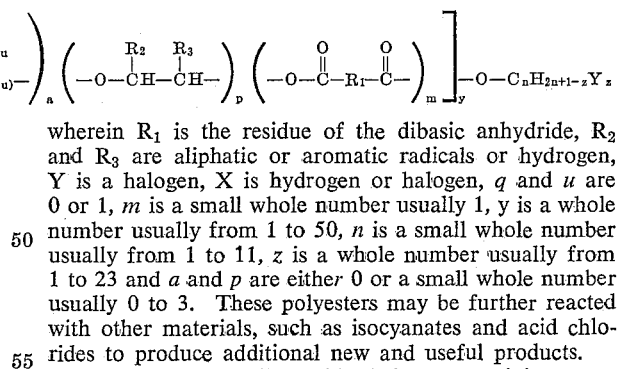

wherein $R_1$ is the residue of the dibasic anhydride, $R_2$ and $R_3$ are aliphatic or aromatic radicals or hydrogen, Y is a halogen, X is hydrogen or halogen, $q$ and $u$ are 0 or 1, $m$ is a small whole number usually 1, y is a whole number usually from 1 to 50, $n$ is a small whole number usually from 1 to 11, $z$ is a whole number usually from 1 to 23 and $a$ and $p$ are either 0 or a small whole number usually 0 to 3. These polyesters may be further reacted with other materials, such as isocyanates and acid chlorides to produce additional new and useful products.

These are thermally stable halogen-containing compounds which are prepared from commercially available and relatively inexpensive materials and which are less sensitive to gelation than the prior art compounds when an aluminum alkoxide catalyst is used. The stoichiometrically proportioned monomers from which they are prepared polymerize completely so that removal of excessive monomers can be omitted.

When modified with ethylenically unsaturated cross-linking agents, the polymer chains of these polyesters cross-link through their sites of unsaturation via the cross-linking agent to give plastics which have physical properties comparable or superior to those of commercially available polyester plastics, superior chemical stability as compared with many commercial polyester plastics, a relatively high order of nonflammability, and which are often nonburning.

The primary esterification reaction may be carried out by merely heating and reacting the alkylene oxide with the starting organic carboxy compound and the halogenated monofunctional alcohol but is preferably conducted in the presence of a reaction catalyst, preferably Friedel-Crafts type catalysts.

These include anhydrous aluminum chloride, antimony pentachloride, stannic chloride, ferric chloride, etc., as well as various halide analogs of the compounds, and their alkoxides. Additional catalysts include boron trifluoride, the formates of zinc, aluminum, and tin, litharge, tertiary amines, etc. The preferred catalyst depends on the individual reaction, and a catalyst particularly effective for one particular system may be relatively inefficient with a different system, or even for different proportions of the same reactants. For example, aluminum chloride is particularly active in the reaction between 3,3,3-trichloropropylene oxide and maleic anhydride. Also, aluminum salts of carboxylic acids and phenols are active catalysts. Examples are aluminum phthalate, aluminum benzoate, aluminum acetate, aluminum phenolate.

Only small amounts of the more active catalysts such as aluminum chloride and stannic chloride are needed to effect a substantially complete reaction in a short time. Satisfactory results are ordinarily obtained with catalyst concentrations of from a few tenths of 1 percent to 1 percent or more, based on the total weight of the reactants, depending on the particular catalyst and reactants. If desired, more or less than this amount may be used, even up to a relatively uneconomic 10 percent by weight of reactants. Thus, the catalyst can be employed in a range of from about 0.01 percent to 10 percent by weight but preferably from 0.1 percent to 0.5 percent by weight of the total reaction mixture.

The catalyst may be used in its isolated form, or it may be suspended in a diluent or dissolved in a solvent. It is generally preferred to use a solventless system whenever possible since solvents are frequently difficult to remove from the product, making them economically undesirable, and they may also adversely influence the reaction and tend to discolor the product. The reaction may also be conducted in the absence of catalyst. However, this procedure has the disadvantage of low yields and, when strong heating is employed, frequently discolored products, as well as an uneconomically long reaction time, and is therefore not preferred.

Both halogenated and nonhalogenated alkylene oxides as well as mixtures of halogenated and nonhalogenated alkylene oxides can be employed for the reaction with the dicarboxylic or dibasic anhydrides and halogenated alcohols.

The halogenated alkylene oxides used to prepare the unsaturated polyesters are vicinal alkylene oxides containing 3 to 4 carbon atoms, having one or two alkyl groups attached to the carbon atoms of the oxirane ring, said alkyl groups having up to 2 carbon atoms. Representative halogenated alkylene oxides are:

3-chloro-1,2-epoxypropane,
3,3-dichloro-1,2-epoxypropane,
3,3,3-trichloro-1,2-epoxypropane,
3,3,3-trifluoro-1,2-epoxypropane,
3-bromo-3,3-dichloro-1,2-epoxypropane,
other mixed 3,3,3-trihalo-1,2-epoxypropanes,
4,4,4-trichloro-1,2-epoxybutane,
3,3-difluoro-3-chloro-1,2-epoxypropane,
3,3-dichloro-3-fluoro-1,2-epoxypropane,
4,4,4-tribromo-1,2-epoxybutane,
3,3-difluoro-3-chloro-1,2-epoxypropane,
3,3-dichloro-3-fluoro-1,2-epoxypropane,
4,4,4-tribromo-1,2-epoxybutane,
3,4-dibromo-1,2-epoxybutane,
4,4,4,3,3-pentachloro-1,2-epoxybutane,
4,4,4,3,3-pentafluoro-1,2-epoxybutane,
4,4,4,3,3 mixed pentahalo-1,2-epoxybutanes,
1,1,1-trichloro-2,3-epoxybutane,
1,1,1,4,4,4-hexachloro-2,3-epoxybutane.

The nonhalogenated alkylene oxides, which can replace a portion or all of the halogenated alkylene oxides in their reaction with dicarboxylic acid anhydrides and halogenated alcohols, can contain 2 to 18 carbon atoms and comprise aliphatic as well as aromatic epoxides. Representative of this group are:

ethylene oxide, 1,2-hexylene oxide,
propylene oxide, styrene oxide,
1,2-butylene oxide, methylstyrene oxide,
2,3-butylene oxide, methylglycidylether,
1,2-dodecylene oxide, phenylglycidylether, etc.

When the halogenous alkylene oxides react, the oxirane ring is opened with the breaking of an oxygen-carbon bond to give a bivalent unit wherein the members of the oxirane ring form a bivalent linear chain having the halogenous lower-alkyl group, originally attached to a carbon atom of the oxirane ring, as a pendant group. By its reaction with the anhydride, this bivalent unit is bonded through the two free valences to other components of the polyester, thereby locating it in and along the polyester chain as a polyhaloalkyloxyalkylene group or radical and building the halogenous lower-alkyl group into the polyester as an exosubstituent. The bivalent oxyalkylene radical may be bonded through both valences by way of ester linkages to acid radicals, or it may be bonded through one or both valences to additional oxyalkylene radicals to form a polyoxyalkylene chain. The average length of the oxyalkylene chains forming a polyether moiety in the polyester chain is determined by the precise reactants, the reaction time, and ratio of reactants, as will be apparent to one skilled in the art.

The anhydride compounds used in formation of the starting unsaturated polyesters are dibasic organic acid anhydrides and preferably contain up to and including 12 carbon atoms per molecule. Representative examples of the ethylenically unsaturated dicarboxylic acid anhydrides are:

maleic anhydride, itaconic anhydride,
chloromaleic anhydride, citraconic anhydride, and the like. These dibasic acid anhydrides can be used singly or in mixtures with other dibasic anhydrides containing no ethylenic unsaturation and which preferably are saturated or free of other than aromatic unsaturation. When such mixtures of ethylenically unsaturated carboxy compounds and carboxy compounds containing no ethylenic unsaturation are used, the ethylenically unsaturated component of the mixture should be present in an amount of at least about 40 percent, preferably at least 60 percent, by weight of the mixture, in order to provide sufficient sites for cross-linking. When less than the preferred minimum is used, cross-linked plastics derived from the resulting polyester tend to be softer and more flexible, with a decline in other desirable properties of the plastic. Usually, for plastics having optimum physical and chemical properties, the amount of ethylenically unsaturated carboxy compound in the mixture exceeds this minimum. Examples representing the saturated dicarboxylic anhydrides which can be used together with ethylenically unsaturated anhydrides to prepare the unsaturated polyesters are:

malonic anhydride,
succinic anhydride,
glutaric anhydride,
adipic anhydride,
phthalic anhydride, tetrahydrophthalic anhydride,
hexachloroendomethylene tetrahydrophthalic anhydride, etc. Also, anhydrides of polycarboxylic acids can be utilized, like e.g. pyromellitic anhydride.

The halogenated monofunctional alcohols of the general formula:

$$C_nH_{2n+1-z}Y_zOH$$

($n=1$ to 11, $Y=$halogen, $z=1$ to 23)

can be employed for the reaction with the anhydrides and epoxides and comprise halogenated aliphatic primary, secondary and tertiary alcohols. Representative examples of this class of halogenated alcohols are:

2,2-dichloroethanol,
2,2,2-trichlorethanol,
2,2,2-trifluoroethanol,
1,1-dichloro-2-propanol,
1,1,3-trichloro-2-propanol,
1,1,1-trichloro-2-propanol,
1,1,1,3-tetrachloro-2-propanol,
1,1,3,3-tetrachloro-2-propanol,
1,1,1,3,3-pentachloro-2-propanol,
1-bromo-1,1-dichloro-2-propanol,
1,1-dibromo-2-propanol,
1,1,1-tribromo-2-propanol,
1,1-dibromo-3-chloro-2-propanol,
1,1,1-tribromo-3-chloro-2-propanol,
1,1,1-trifluoro-3-chloro-2-propanol,
1,1,1-trifluoro-2-propanol,
1,3-dibromo-2-propanol,
2,2,3,3-tetrafluoro-1-propanol,
2,2,3,3,3-pentafluoro-1-propanol,
2,3-dibromo-1-propanol,
2,3-dichloro-1-propanol,
2,2,3,3,4,4,4-heptafluoro-1-butanol, and
1,1,1-trichloro-2-methyl-2-propanol.

Any halogen or combination of halogens may be present in the starting halogenous alkylene oxides or in the halogenated monofunctional alcohols. Of the halogens chlorine, fluorine, and bromine are preferred and the halogen, therefore, has an atomic weight of 19 to 80 inclusive.

The properties and structure of the polyesters may be varied by using mixtures of alkylene oxides, such as two or more halogenous alkylene oxides together with two or more nonhalogenous alkylene oxides or one or more halogenous alkylene oxides with one or more mono- or nonhalogenous alkylene oxides. The use of such mixed oxides has the effect of minimizing the crystallinity of the polymer, and generally results in a more flexible product when the polyester is further reacted. By controlling the order of addition of these combinations of alkylene oxides, it is moreover possible to tailor the polymer. In general, the higher the halogen content incorporated into the polyester, the better the over-all fire resistance and chemical resistance of the polyester products.

The polyesters are generally formed by heating and reacting the alkylene oxide with the starting ethylenically unsaturated organic dicarboxy anhydride and the halogenated alcohol as well as other reactants, if any, preferably in the presence of a suitable reaction catalyst at an elevated temperature ranging from 75° C. to the reflux temperature of the alkylene oxide or higher. In general, a temperature range between 110° C. and 140° C. is preferred.

Any of several different general procedures may be used in carrying out the reaction between the starting alkylene oxide, the dicarboxy compound and the halogenated alcohol. The oxide, dicarboxy compound, halogenated alcohol and reaction catalyst, if any, can all be mixed at once and the reaction mixture heated to the desired temperature range. The reaction between the alkylene oxide, dicarboxy compound and halogenated alcohol is exothermic at reaction temperature so that considerable heat may evolve and maintain the desired temperature for a period without additional external heating and may even require external cooling.

It is possible to take advantage of the exothermic heat of reaction by adding one or more of the reactants to the reaction mixture portionwise, preferably the alkylene oxide at such a rate that the desired reaction temperature is maintained. Once the initial polymerization stage has been completed, as indicated by the cessation of refluxing when a solventless reaction is conducted at the reflux temperature of the reaction mixture, the reaction mixture is heated for an additional period to drive the reaction to completion and to effect the desired degree of polymerization. The procedure may be the same whether one or more halogenous alkylene oxides or mixtures with nonhalogenous alkylene oxides are employed as starting material or whether one or more ethylenically unsaturated dicarboxylic compounds or mixtures thereof with nonethylenically unsaturated dicarboxylic compounds are employed as starting materials.

The catalyst may be added to a mixture of all the reactants at once or it may be initially reacted or mixed with the dicarboxy compound or mixture of dicarboxy compounds.

The time necessary to react the alkylene oxide, anhydride and halogenated alcohol can vary between 30 minutes and 7 hours and depends on the catalyst employed. The reaction is considered complete when there are no volatiles left in the reaction mixture or when the amount of volatiles in the reaction mixture levels off to a constant minimum.

Although other procedures may be used, the reaction is advantageously carried out in a polymerization or other type reaction container fitted with condensing and stirring apparatus, a temperature recording and reading device and a heat source.

In the formation of the unsaturated polyesters used in the present invention, it is possible to vary the proportions of alkylene oxide, dicarboxy compound and halogenated alcohols over a considerable range. The polyesters so formed and in turn the cross-linked compositions derived from these polyesters are of somwehat varied character depending on the proportions used. The proportions control the chemical and physical properties of the polyester, such as consistency, color, molecular weight, hydroxyl content, and halogen content as well as the properties of a cured polyester prepared therefrom such as heat distortion temperature. Accordingly, the preferred range in an individual case depends on a number of factors, including properties desired in the cross-linked compositions based on the polyester, the exact reactants employed, etc. In most instances, when preparing the ethylenically unsaturated polyesters, it is preferred to use no more than three moles of alkylene oxide for every mole of dicarboxy compound in order to obtain polyesters having optimum cross-linking densities. At molecular ratios of alkylene oxide to ethylenically unsaturated dibasic carboxy compound above three to one, the decreased cross-link density, resulting from the increased average length of the polyether units in the polyester chain and consequently the increased spacing between the unsaturated sites of the polyester, is manifested by a decline in some of the advantageous physical properties of the cross-linked plastic, including hardness and strength, as well as in some of the advantageous chemical properties. For some applications, however, the higher ratios are suitable. In general, the higher the ratio of alkylene oxide to ethylenically unsaturated dicarboxy compound, other factors being constant, the softer and more elastic the cross-linked polyester composition will be. In general, it is preferred to employ equal molar amounts of the alkylene oxide and dicarboxylic acid anhydride and to vary the mole ratio of the halogenated alcohol to the dicarboxylic acid anhydride from about 1:1 to 1:50 with the preferred range being from 1:2 to 1:12. Although the preferred proportion of alkylene oxide to dicarboxylic acid anhydride is 1:1, this proportion can be varied between 6:1 and 1:1.

When the mixtures of ethylenically unsaturated dicarboxy compounds with nonethylenically unsaturated dicarboxy compounds are used, the resulting increased spacing between unsaturated sites of the polyester, due to the inclusion in the polyester chain of dicarboxy units containing no ethylenic unsaturation, is responsible for a decreased cross-link density and consequently also a diminution of the desirable physical properties of the cross-linked composition.

The starting polyester compounds are soluble in most organic polar and non-polar solvents, with the notable exception, in most cases, of diethylether and water, as well as in many monomers, including styrene, butyl methacrylate, triallylisocyanurate, diallylphthalate, etc.

Polymers prepared from maleic anhydride, 3,3,3-trichloropropylene oxide and 1,1,1,3,3-pentachloroisopropanol, especially in the presence of an aluminum isopropoxide or aluminum phthalate catalyst, give cross-linked products of particular interest and value and therefore represent preferred starting polyesters according to the invention. These are preferably cross-linked with about 20–50 percent by weight styrene as more fully disclosed hereinafter.

The molecular weights of the starting unsaturated polyesters range from that of the reaction product of one dicarboxy compound molecule with one oxide molecule and one halogenated monofunctional alcohol molecule, generally around 200, but depending of course on the individual reactants, to more than 10,000. However, polyesters having molecular weights above 2,000 are frequently excessively viscous for convenient use in further reactions. Those in the 1,000 to 2,000 molecular weight range generally have the most workable viscosities and are therefore ordinarily preferred.

These polyesters can be further reacted with isocyanates or inorganic or organic acid chlorides to yield modified polychloroesters characterized by improved heat distortion temperature of the styrenated, cured polyester, improved chemical and solvent resistance of the styrenated, cured polyester, and improved nonburning characteristics of the styrenated, cured polyester when phosphorus or antimony are chemically incorporated.

The compounds suitable for this purpose include dicarboxylic acid dichlorides, for example, terephthaloylchloride, isophthaloylchloride, adipoylchloride, oxaloylchloride; phosgene; phosphorus chlorides and phosphoryl chlorides, for example, phosphorus trichloride, phenylphosphonous dichloride, phosphorus oxychloride, phenylphosphonic dichloride; antimony trichloride; diisocyanates, such as tolylene diisocyanates, xylylene diisocyanates, diphenylmethane diisocyanates, triisocyanates, such as triphenylmethane triisocyanates or isocyanates with higher functionality such as polyaryl polyisocyanates.

The proportions of the acid chlorides or isocyanates to the polyester may be varied over a substantial range and the preferred range in an individual case depends on a number of factors including the intended use of the ultimate product, the properties desired, the exact reactants employed, etc. In general, it is preferred to employ an amount of acid chloride or isocyanate that is equivalent to the hydroxyl content of the polychloroester.

CROSS-LINKAGE

As already stated, the cross-linked polyesters of the present invention are prepared by cross-linking an ethylenically unsaturated halogenous polyester with an ethylenically unsaturated cross-linking agent. The conditions are, in general, conventional for the cross-linking of any unsaturated polymer with an unsaturated cross-linking agent. The ethylenically unsaturated cross-linking agents which may be employed are materials containing at least one reactable ethylenically unsaturated group. These materials include polymerizable ethylenically unsaturated monomers such as styrene, vinyltoluene, alpha-methyl styrene, chlorostyrene, fluorostyrene, trifluoromethylstyrene, dichlorostyrene, divinylbenzene, butadiene, diallylphthalate, triallylisocyanurate, acrylic acid, the alkyl acrylates and methacrylates, including methyl methacrylate, ethyl methacrylate, butyl methacrylate, etc., lower-alkyl esters of maleic and fumaric acid, acrylonitrile, vinylidene cyanide, vinyl pyridine, vinyl pyrrolidone, vinyl carbazole, vinyl ketones such as vinyl butyl ketone, etc., drying oils including linseed oil, perilla oil, poppy oil, etc., as well as polymeric ethylenically unsaturated cross-linking agents such as, for example, natural and synthetic rubbers, e.g., the isoprene rubbers, butadiene rubbers, styrene-butadiene rubbers, vinyl polymers, etc., and the like. The cross-linking agent selected in a particular instance depends on numerous factors such as, among others, the properties desired in the final product, the cost and availability of the cross-linking agent, and the properties (especially degree of unsaturation) of the cross-linking agent itself, and for different applications different cross-linking agents may be chosen, although in every case those capable of free-radical initiation are preferred. Obviously, a wide latitude is possible in selection of the cross-linking agent, and it may even involve the use of combinations of two or more cross-linking agents. By way of example, styrene is frequently used due to its favorable cost, compatibility and reactivity, as well as the excellent physical properties it provides in the final cross-linked product. However, by including a small amount of a different cross-linking agent, for example, an alkyl methacrylate, e.g., butyl methacrylate, the weathering characteristics and optical properties of the plastic may be improved. By cross-linking the polyester with a compound which is more highly functional than styrene, such as diallylphthalate, divinylbenzene, or triallylisocyanurate, many of the physical and chemical properties of the plastic can be improved, for example, resistance to embrittlement and creasing in organic solvents such as acetone or ethylene dichloride, heat resistance, etc. Generally, the greater the functionality of the cross-linking agent, the greater the chemical and heat resistance of the cross-linked polymer.

The amount of cross-linking agent used in cross-linking the starting halogenous unsaturated polyester to prepare the compositions of the present invention depends to a considerable extent on the particular cross-linking agent and polyester employed, as well as the chemical and physical properties desired in the final product. The amount used can vary over a considerable range. As little as 20% of cross-linking agent by weight of the polyester can be used to prepare a hard, durable plastic having a high resistance to combustion. On the other hand, by increasing the amount of cross-linking agent to as much as 40–50% by weight, plastics can be obtained which are more flexible and less hard. In general, the greater the proportion of cross-linking agent, the less hard and more flexible the product. The usual amount of cross-linking agent is about 30–40% by weight but, if desired, more or less may be used, and even excesses of cross-linking agent over polyester. The optimum amount of cross-linking agent depends upon the characteristics desired in the product. Preferred ranges are ordinarily about 10 to about 50% by weight and usually between about 30 and 40% by weight of polyester.

The cross-linking agents generally exhibit good compatibility with the ethylenically unsaturated halogenous polyesters, and therefore may ordinarily be mixed with the starting polyester with or without the aid of plasticizers and at any time prior to the final cross-linking reaction step. The polyester may, for example, be mixed with the desired cross-linking agent to give a polyester resin and cross-linking agent mixture which can be stored until use and shipped in any convenient form, such as solid, granular, or powder form, and in any convenient quantity. Or, the cross-linking agent (or additional cross-linking agent) may be mixed with the polyester at any other time prior to the actual step of cross-linking. Cross-linkage is simply effected by exposing the mixture of the polyester and cross-linking agent to favorable reaction conditions. These conditions involve the use of a vinyl polymerization initiator, preferably a chemical initiator of the free-radical type. Any established vinyl polymerization initiator may be employed. Examples of these polymerization initiators are the peroxides, representatively benzoyl peroxide, methylethylketone peroxide, acetyl peroxide, hexachloroacetyl peroxide, succinic acid peroxide, di-tertiary-butyl peroxide, di-tertiary-butyl hydroperoxide, cumene hydroperoxide, alpha,alpha'-azo-diisobutyronitrile, etc. Other initiators which may be used to initiate the cross-linking include heat, electromagnetic radiation, dielectric heating, irradiation, etc., as well as combinations thereof and combinations with chemical initiators. The primary consideration in selecting a polymerization initiator is the temperature at which the cross-linking or curing process is desired to be carried out and the rate necessary to achieve a satisfactory gelled system. As usual, under the same reaction conditions some initiators will effect complete reaction while others will effect a relatively incomplete reaction. Selection of the particular reaction initiator will of course be made with these factors in mind, as well as the characteristics desired in the final product.

The optimum time and temperature for curing of a particular polyester-cross-linking agent composition depends on various factors, in addition to the reactants employed in preparation of the polyester and cross-linking of the same. The strength and many other of the chemical and physical properties of the cross-linked resin depend on the degree of cure and the temperature at which the cure is effected and, for a given resin cured at a specific temperature, the tensile strength of the final product appears to increase with the degree of cure. Ordinarily, temperatures of about 60° C. are satisfactory, although higher or lower temperature ranges can be used if desired. Lower temperatures generally require a longer curing time for a given degree of cure, while higher temperatures require a shorter time. Of course, the length of the treatment is governed by the degree of cure desired. Generally, 6 to 20 hours is sufficient to effect a normal cure, although a shorter or longer period may be used, as in special cases with certain extremely active initiators or accelerators, in which case the curing period for the particular system can be considerably shortened. For purposes of shortening the cure or permitting a lower curing temperature, it is preferred to employ an accelerator in addition to the cross-linking initiator. For example, dimethylaniline, cobalt naphthenate or oleate, or similar accelerators are commonly employed for such purposes. It is sometimes also desirable to vary conditions during the cure, as for example by curing at one temperature followed by a post cure at the same or a different temperature.

It is also within the contemplation of the present invention to use more than one unsaturated halogenous polyester or to supplement the described starting halogenous polyester, or to supplement the described starting halogenous polyesters with other polyesters, such as standard commercially available polyesters. These additional polyesters also contain ethylenic unsaturation. Such polyesters include standard halogenous or nonhalogenous polyesters based on maleic or fumaric acids or anhydrides, as well as those based on other ethylenically unsaturated polybasic acids or anhydrides, and polyesters prepared from mixtures of ethylenically unsaturated acids or anhydrides with acids or anhydrides free from other than aromatic unsaturation, such as phthalic acid, hexachloro-endomethylene tetrahydrophthalic acid, adipic acid, etc.

These and other polyesters are known in the art and may be obtained commercially, or be prepared by any of the standard procedures for preparing such polyesters. In order to obtain satisfactory fire-resistant properties in the cross-linked product, it is recommended that nonhalogenous polyesters not exceed 25% by weight of the mixture of the polyesters. The polyesters are compatible before the cross-linking step and the procedure employed is to admix the starting polyesters, when more than one is used, and then cross-link the mixture.

The properties of the cross-linked polyester can also be varied by incorporating plasticizers into the composition either chemically or physically. These plasticizers include, among others, polyfunctional compounds capable of reacting with free hydroxy or carboxy groups of the polyester, as well as vinyl plasticizers, such as dioctyl phthalate, octyl cresyl phosphate, dibutyl phthalate, other alkyl and alkoxyalkyl ethers of dicarboxylic acids, saturated polyesters, etc. The resins of this invention can also be modified by the addition of pigments, fillers, stabilizers, lubricants, etc., without detracting from the benefits of the invention.

It is possible to improve the over-all color of the plastic by adding a small amount of an antioxidant during some stage of its preparation, advantageously the final cross-linking stage. Many such agents are known, such as cadmium and barium soaps, tin compounds such as the octanoate, etc. Of the antioxidants the phosphites are preferred, representative examples being dimethyl phosphite and triphenyl phosphite. In addition to improving the color of the finished product, the phosphites often impart further fireproofing characteristics to the system.

The cross-linked resins of the present invention are prepared by mixing the polyester and cross-linking agent and casting, molding, or applying the mixture in some convenient manner to a mold, form, or surface, etc., and curing the mixture, generally by adding a chemical vinyl polymerization initiator and heating the mixture until the desired degree of cure is achieved. The resulting products have a wide variety of properties, as discussed hereinbefore, and are characterized by an order of nonflammability superior to that of presently known cross-linked polyester resins. They have chemical resistance comparable and even superior to that of standard polyester plastics presently available. In addition, the cross-linked polyester compositions generally have favorable moisture absorption properties.

The cross-linked polyester resins of the invention may be advantageously utilized as elastomers in such diversified fields as shoes, rubber tires, gears and gaskets, elastic threads, elastomer-coated fabrics, adhesives, as well as many others. They may be used to prepare tough, flexible to rigid thermosetting coatings. One preferred class of such coatings is prepared using a drying oil such as linseed, perilla, or poppy oil, etc., as cross-linking agent. Such coatings are prepared by mixing the halogenous polyester and drying oil and applying the resulting mixture to a surface, such as by dipping, brushing, knife coating, roller coating, spraying, etc., and heating the resulting film at an elevated temperature for a time sufficient to cure the film and produce a tough resistant coating which exhibits good fire and chemical resistance. Alternatively, the film may be allowed to air-dry or otherwise caused to undergo oxidative cross-linking to give tough, elastic weather and chemical resistant films having improved fire resistance.

Hard polyester plastics can also be prepared according to the present invention, and are especially useful where plastics having improved fire resistance are of interest. These plastics can be used alone, or they can be reinforced with strands or fibers of synthetic or natural materials including glass fibers, nylon, cotton, sisal asbestos, cellulose, as well as many others, in any convenient form such as fabric, mats, yarn, chopped or continuous roving form, etc. Some strength increase can also be achieved by using certain nonfibrous materials such as carbon, wood and pigment fillers, etc. Such reinforcing material can be included in the composition in any convenient manner, such as by mixing the composition with the reinforcing material or vice versa, prior to, at the same time, or after applying the resin mixture to the desired mold, form, or surface, etc., or the resin mixture may be applied directly to the reinforcing material, as when fabrics, sheets, or mats are being used. The resin mixture and reinforcing material may also be combined in situ and cured. Such procedures and techniques known and used in the art and which typify these and other possible variations include hand lay-ups, spray-ups, preforms, premixes, prepegs, and filament winding, as well as numerous others. Such reinforced or filled resins, as well as the resins without reinforcing materials, are useful in a variety of construction, structural, and manufacturing applications wherein strong durable plastics can be employed, as for example resin-rigidized substrates, laminates, filled and unfilled plastics, in situ cured plastics, etc., and including applications where similar cross-linked polyester resins are now being used, and especially where increased fire resistance and/or chemical resistance of the compositions of the invention are of value. Innumerable other uses and applications of the cross-linked compositions of the present invention exist, and will be readily appreciated by one skilled in the art. The preferred halogen content by weight in the cross-linked polyesters of the invention is between about 12 and 38%, and especially between about 20 and 35%.

TEST PROCEDURES

Several general procedures can be used in testing the polyester products of the present invention. Burning tests are made by ASTM D-635-56T test procedure which involves exposing a sample of the cross-linked polyester plastic having a standard size and shape directly to a Bunsen burner flame.

The hardness of the cast polyester is determined by using a Barcol impressor, manufactured by Barber-Colman, Rockford, Illinois, a portable spring-loaded instrument originally designed to distinguish various alloys of aluminum. The indenter is a truncated cone with a 26 degree angle and a flat tip 0.0062 inch in diameter. The scale reads from 0 to 100 direct hardness.

The tensile properties, particularly tensile strength, are determined by ASTM D-638 test procedure and are measured on the "Instron," manufactured by Instron Engineering Corporation. A sample 8.5 inches by 0.5 inch by less than 0.25 inch is pulled at a very slow rate until the sample ruptures. The force in pounds per square inch required to break the sample is measured, as well as length of sample, etc.

The flexural properties are determined by ASTM D-790 test procedure, which involves bending a standard bar of the plastic, having a rectangular cross-section and supported at both ends in the manner of a simple beam, by applying a load at its midpoint. The sample is deflected until rupture occurs or until the maximum fiber strain of five percent is reached. The flexural modulus can be measured by drawing a line tangent to the slope of the stress-strain curve at the origin.

Water absorption is determined by ASTM D-570 test procedure and is the percent water absorbed by a three-inch by one inch by less than 0.25 inch sample during the duration of the test. The increase in weight is measured and expressed as a percentage.

The heat distortion test, ASTM D-648-56, determines the temperature at which an arbitrary deformation occurs when the specimen is subjected to an arbitrary set of test conditions. A bar (0.5 by 0.5 by 5 inches) of test material is subjected to a load of 264 p.s.i. and the temperature is increased at the rate of 2° C. per minute. The temperature at which the bar has deflected 0.010 inch is reported as the heat distortion temperature. Mineral oil is the usual immersion liquid.

The product of the invention is accordingly a cross-linked polyester resin which is the reaction product of
(I) An ethylenically unsaturated polyester of
 (1) a dicarboxylic organic anhydride selected from the group consisting of
  (a) ethylenically unsaturated dicarboxylic acid anhydrides and
  (b) mixtures of the ethylenically unsaturated dicarboxylic acid anhydrides and a member of the group consisting of saturated dicarboxylic acid anhydrides and dicarboxylic acid anhydrides free of other than aromatic unsaturation, the total amount of ethylenically unsaturated dicarboxylic material being present in an amount of at least about 40 percent by weight of the total amount of dicarboxylic material as defined in (b), and
 (2) at least one vicinal alkylene oxide selected from the group consisting of
  (a) an alkylene oxide containing from 2 to 18 carbon atoms inclusive, selected from the group consisting of saturated alkylene oxides and alkylene oxides which are free from other than aromatic unsaturation and
  (b) an alkylene oxide as defined in (a) but containing from 3 to 4 carbon atoms and at least 1 halogen atom, each halogen atom having an atomic weight of 19 to 80 inclusive and having from 1 to 2 alkyl groups attached to at least one carbon atom of the oxirane ring, said alkyl groups having up to 2 carbon atoms, and
 (3) a halogenated monofunctional alcohol having the following general formula:

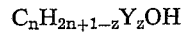

$$C_nH_{2n+1-z}Y_zOH$$

wherein $n$ is an integer of from 1 to 11, $z$ is an integer from 1 to 23, and Y is a halogen having an atomic weight of 19 to 80 inclusive,
and the reaction product of A the above described polyester and B a compound selected from the group consisting of isocyanates and inorganic and organic acid chlorides and
(II) An ethylenically unsaturated cross-linking agent, said cross-linked polyester resin being characterized by a relatively high order of non-flammability and chemical resistance.

The process of the invention is accordingly a process for preparing a cross-linked polyester resin comprising reacting
(I) an ethylenically unsaturated polyester of
 (1) a dicarboxylic organic anhydride selected from the group consisting of
  (a) ethylenically unsaturated dicarboxylic acid anhydrides and
  (b) mixtures of the ethylenically unsaturated dicarboxylic acid anhydrides with a member of the group consisting of saturated dicarboxylic acid anhydrides and dicarboxylic acid anhydrides free of other than aromatic unsaturation, the total amount of ethylenically unsaturated dicarboxylic material being present in an amount of at least about 40 percent by weight of the total amount of dicarboxylic material as defined in (b), and
 (2) at least one vicinal alkylene oxide selected from the group consisting of
  (a) an alkylene oxide containing from 2 to 18 carbon atoms inclusive, selected from the group consisting of saturated alkylene oxides and alkylene oxides which are free other than aromatic unsaturation and
  (b) an alklylene oxide as defined in (a) but containing from 3 to 4 carbon atoms and at least 1 halogen atom, each halogen having an atomic weight of 19 to 80 inclusive and having from 1 to 2 alkyl groups attached to at least one carbon atom of the oxirane ring, said alkyl groups having up to 2 carbon atoms, and (3) a halogenated monofunctional alcohol having the following general formula:

$$C_nH_{2n+1-z}Y_zOH$$

wherein $n$ is an integer of from 1 to 11, $z$ is an integer from 1 to 23, and $Y$ is a halogen having an atomic weight of 19 to 80 inclusive in the presence of a reaction catalyst, and the reaction product of A the above described polyester and B as a compound selected from the group consisting of isocyanates and inorganic and organic acid chlorides, and (II) An ethylenically unsaturated cross-linking agent, in the presence of a vinyl polymerization initiator.

Example 1

The following examples further illustrate this invention:

In a 1-liter round-bottom flask equipped with a mechanical stirrer, thermometer, heating mantle and a water-cooled condenser, 322 grams (2 moles) of 3,3,3-trichloropropylene oxide, 196 grams (2 moles) of maleic anhydride, 155 grams (0.67 mole) of 1,1,1,3,3-pentachloroisopropanol, and 4.0 grams of aluminum triisopropoxide were charged and the mixture initially heated. After initial heating the mixture was allowed to exotherm to a temperature of 130–140° C. where it was maintained by cooling for 50 minutes. Upon completion of the reaction 4 grams of volatiles were stripped from the reacted mixture at 120° C. in vacuum.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected at 60° C. for 16 hours and 100° C. for 5 hours. The product was nonburning and clear and transparent and golden tan to brown in color.

Example 2

A polychloroalkyl ester resin was prepared as described in Example 1 and 224 grams were mixed with 109 grams styrene, 18 grams of butyl methacrylate, 1.75 grams (0.5%) of benzoyl peroxide and 3.5 ml. (1%) of dimethylphosphite and a plate was cast. Cure was effected by heating at 60° C. for 2 days. The product was nonburning and clear and transparent and golden tan to brown in color.

Example 3

A polychloroalkyl ester resin was prepared as described in Example 1 and 240 grams were mixed with 160 grams of triallylisocyanurate to give a mixture containing 40% triallylisocyanurate. 4 grams (1%) of benzoyl peroxide were added and a plate was cast. Cure was effected by heating at 60° C. for 30 hours. The product was nonburning and clear and transparent and golden tan to brown in color.

Example 4

Example 3 was repeated using 160 grams of diallylphthalate in place of the 160 grams of triallylisocyanurate. The product was nonburning.

Example 5

Example 3 was repeated using 160 grams of vinyl toluene in place of the 160 grams in triallylisocyanurate. The product was nonburning.

The physical properties of the plastics prepared in Examples 1 through 5 are tabulated in Table I below.

TABLE I

| Example | 1 | 2 | 3 | 4 | 5 |
|---|---|---|---|---|---|
| Cross-linking monomer | 40% styrene | 35% styrene plus 5% butyl methacrylate | 40% diallyl-phthalate | 40% triallyl-isocyanurate | 40% vinyl toluene |
| Specific gravity | 1.359 | 1.362 | 1.50 | 1.51 | 1.345 |
| Barcol hardness | 37 | 35 | 50 | 57 | 33 |
| Tensile strength, p.s.i. | 6,281 | 6,115 | 3,012 | 2,251 | 4,537 |
| Water absorption, percent: | | | | | |
| 24 hrs. at R.T. | 0.051 | 0.112 | 0.080 | 0.118 | 0.068 |
| 4 hrs. at 100° C. | 0.57 | | | | |
| Flexural strength, p.s.i. | 11,811 | 15,030 | | | |
| Heat distortion, ° C. | 107 | 70 | 144 | 160 | 80 |

Example 6

Example 3 was repeated using 160 grams of butyl methacrylate in place of the 160 grams of triallylisocyanurate. The product was nonburning and had a specific gravity of 1.350, a flexural yield modulus of 1,025 pounds per square inch, a tensile strength of 3,021 p.s.i., and water absorption of 0.08% in 24 hours at room temperature.

Example 7

350 grams (2 moles) of 4,4,4-trichloro-1,2-epoxybutane, 196 grams (2 moles) of maleic anhydride, 77 grams (0.33 mole) of 1,1,1,3,3-pentachloroisopropanol, and 4.0 grams of aluminum isopropoxide are reacted in the manner described in Example 1.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 8

161 grams (1 mole) of 3,3,3-trichloropropylene oxide, 72 grams (1 mole) of 1,2-butylene oxide, 196 grams (2 moles) of maelic anhydride, 155 grams (0.67 mole) of 1,1,1,3,3-pentachloroisopropanol, and 4.0 grams of aluminum isopropoxide are reacted in the manner described in Example 1 above.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 9

322 grams (2 moles) of 3,3,3-trichloropropylene oxide, 224 grams (2 moles) citraconic anhydride, 77 grams (0.33 mole) of 1,1,1,3,3-pentachloroisopropanol, and 4.0 grams of aluminum isopropoxide are reacted in the manner described in Example 1 above.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 10

322 grams (2 moles) of 3,3,3-trichloropropylene oxide, 100 grams (1 mole) of succinic anhydride, 112 grams (1 mole) of citraconic anhydride, 77 grams (0.33 mole) of 1,1,1,3,3-pentachloroisopropanol, and 4.0 grams of aluminum isopropoxide are reacted in the manner described in Example 1 above.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 11

In a 0.5-liter round-bottom flask equipped with a heating mantle, mechanical stirrer, thermometer, and a water-cooled condenser, 64 grams (0.4 mole) 3,3,3-trichloropropylene oxide, 39.2 grams (0.4 mole) maleic anhydride, 0.8 gram aluminum isopropoxide and 10.9 grams (0.067 mole) 1,1,1-trichloro-2-propanol were charged and the mixture slowly heated. After applying the heat to initiate the reaction, slight cooling by means of a water bath was employed to maintain the reaction temperature at 150° C. The reaction was continued for 1 hour.

A quantity of the polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 12

In a 1-liter round-bottom flask equipped with a mechanical stirrer, thermometer, and a water-cooled condenser and provided with a heating mantle, 322 grams (2 moles) of 3,3,3-trichloropropylene oxide, 196 grams (2 moles) of maleic anhydride, 2 grams of aluminum chloride and 54.5 grams (0.335 mole) of 1,1,1-trichloro-2-propanol were charged and the mixture heated to 150° C. at which temperature it was maintained by intermittent cooling with a water bath. The reaction mixture was maintained at this temperature for 1 hour.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 13

In a 0.5-liter round-bottom flask equipped with a mechanical stirrer, thermometer, water-cooled condenser, and heating mantle, 64 grams (0.4 mole) 3,3,3-trichloropropylene oxide, 39.2 grams (0.4 mole) maleic anhydride, 9.92 grams (0.066 mole) 2,2,2-trichloroethanol, and 0.4 gram aluminum chloride were charged and the mixture heated. The mixture was allowed to exotherm to a temperature of 150–160° C. at which temperature range it was maintained by intermittent cooling for 1½ hours.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 14

In a 1-liter round-bottom flask equipped with a mechanical stirrer, thermometer, heating mantle, and a water-cooled condenser, 322 grams (2 moles) 3,3,3-trichloropropylene oxide, 196 grams (2 moles) maleic anhydride, 28.6 grams (0.222 mole) of 1,3-dichloroisopropanol, and 19.0 grams (0.117 mole) of 1,1,3-trichloroisopropanol and 4.0 grams of aluminum triisopropoxide were charged and the mixture heated. The mixture was permitted to exotherm to the temperature of 130–140° C. at which temperature it was maintained by cooling in a cooling bath for 1½ hours. After 1½ hours reaction time, no unreacted volatiles remained, thus indicating complete conversion to polymeric material.

A quantity of this polychloroalkyl ester resin (240 grams) was mixed with 160 grams of styrene to give a mixture containing 40% styrene. 2 grams (0.5%) of benzoyl peroxide and 4 ml. (1%%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 15

In a 1-liter round-bottom flask equipped with a mechanical stirrer, thermometer, heating mantle, and a water-cooled condenser, 322 grams (2 moles) of 3,3,3-trichloropropylene oxide, 147 grams (1.5 moles) of maleic anhydride, 74 grams (0.5 mole) of phthalic anhydride, 54 grams (0.33 mole) of 1,1,1-trichloroisopropanol, and 4.0 grams of aluminum triisopropoxide were charged and the mixture heated to initiate the reaction. The mixture was then allowed to exotherm to a temperature of 130–140° C. at which temperature it was maintained by intermittent cooling for 1½ hours. After completion of the reaction the mixture was stripped of 1 gram of volatiles in vacuum at 140° C.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

Example 16

*Aluminum phthalate preparation.*—In a 1-liter round-bottom flask 49.8 grams (0.3 mole) of phthalic acid and 61.2 grams (0.3 mole) of aluminum isopropoxide were dissolved in 500 milliliters of anhydrous isopropanol. The solvent was stripped at 15 millimeters of mercury on a steam bath. After all the solvent had been removed, the product contained 20.4 percent aluminum oxide as determined by ignition.

*Polyester preparation.*—In a 1-liter round-bottom flask equipped with a mechanical stirrer, thermometer, heating mantle, and a water-cooled condenser, 322 grams (2 moles) of 3,3,3-trichloropropylene oxide, 196 grams (2 moles) of maleic anhydride, 155 grams (0.68 mole) of 1,1,1,3,3pentachloroisopropanol were mechanically stirred and initially heated to 130–140° C. at which temperature it was maintained by intermittent cooling. 0.7 gram of the above aluminum phthalate was then added in 7 increments over a period of 3 hours. After one additional hour at 130° C., only traces of volatiles could be removed at 130° C. in vacuum from the reacted mixture.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was non-burning and clear and transparent and golden tan to brown in color.

*Example 17*

In a 1-liter round-bottom flask equipped with a mechanical stirrer, thermometer, heating mantle, and a water-cooled condenser, 322 grams (2 moles) of 3,3,3-trichloropropylene oxide, 196 grams (2 moles) of maleic anhydride, and 93 grams (0.4 mole) of 1,1,1,3,3-pentachloroisopropanol were stirred at 130–140° C. and 0.7 gram aluminum phthalate, prepared as described in Example 7, were added in 7 increments over a period of 2 hours and the mixture initially heated. After 3 additional hours stirring at 130–140° C. the reaction was terminated, and 16 grams of volatiles were removed at 135° C. in vacuum.

A quantity of the polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

*Example 18*

In a 1-liter round-bottom flask equipped with a mechanical stirrer, thermometer, heating mantle and a water-cooled condenser, 322 grams (2 moles) of 3,3,3-trichloropropylene oxide, 196 grams (2 moles) of maleic anhydride, and 57.7 grams (0.25 mole) of 1,1,1,3,3-pentachloroisopropanol were charged and initially heated to a temperature of 130–140° C. at which it was maintained and 0.7 gram of aluminum phthalate, prepared as described in Example 7, was added in 7 increments over a period of 2 hours. The reaction mixture was maintained at this temperature and stirred for an additional 3 hours, after which the reaction was terminated. One gram of volatiles was removed from the reacted mixture at 130° C. in a vacuum.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

*Example 19*

In a 1-liter round-bottom flask equipped with a mechanical stirrer, thermometer, heating mantle, cooling means, and a water-cooled condenser, 161 grams (1 mole) of 3,3,3-trichloropropylene oxide, 58 grams (1 mole) of propylene oxide, 196 grams (2 moles) of maleic anhydride, 155 grams (0.67 mole) of 1,1,1,3,3-pentachloroisopropanol, and 4.0 grams of aluminum triisopropoxide were charged and the mixture initially heated.

The mixture was allowed to exotherm to a temperature of 130–140° C. at which temperature it was maintained by cooling for one hour. Heavy reflux could be observed during the first 5 minutes. Upon completion of the reaction, the reaction mixture was stripped of one gram of volatiles in vacuum.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

*Example 20*

In a 1-liter round-bottom flask equipped with a mechanical stirrer, thermometer, heating mantle, and a water-cooled reflux condenser, 483 grams (3 moles) of 3,3,3-trichloropropylene oxide, 176 grams (1.8 moles) of maleic anhydride, 46.2 grams (0.2 mole) of 1,1,1,3,3-pentachloroisopropanol, and 6.0 grams of aluminum triisopropoxide were charged and the mixture initially heated to a temperature of 110° C. The temperature was then permitted to rise to 140° C. and the reaction mixture kept for an additional hour at 130–140° C. After completion of the reaction, the mixture was stripped of its volatiles at 140–115° C. in vacuum for 30 minutes. 54 grams of volatiles were removed from the reacted mixture.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

*Example 21*

In a 1-liter round-bottom flask equipped with a mechanical stirrer, thermometer, and a water-cooled condenser 322 grams (2 moles) of 1,1,1-trichloropropylene oxide, 196 grams (2 moles) of maleic anhydride, 4.0 grams of aluminum isopropoxide, and 77 grams (0.33 mole) of 1,1,1,3,3-pentachloroisopropanol were charged and the mixture heated to a temperature of 130–140° C., after which the source of heat was removed. A temperature of 130–140° C. was maintained by intermittent cooling in a water bath. The temperature was so maintained for 30 minutes, after which the same temperature was maintained for another 30 minutes with the aid of a heating mantle.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

*Example 22*

In a 1-liter round-bottom flask equipped with a mechanical stirrer, thermometer, a water-cooled condenser and provided with a heating mantle, 258 grams (1.6 moles) of 3,3,3-trichloropropylene oxide, 23.2 grams (0.4 mole) of propylene oxide, 196 grams (2 moles) of maleic anhydride, 4.0 grams of aluminum isopropoxide, and 155 grams (0.67 mole) of 1,1,1,3,3-pentachloroisopropanol were charged and this mixture heated to 70° C. where the exothermic reaction began. The temperature then rose to 130° C. without heating and a temperature 130–140° C. was maintained by intermittent cooling in a water bath for 20 minutes, after which the cooling was no longer necesssary. The reaction was continued for a total time of 1½ hours.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. The product was nonburning and clear and transparent and golden tan to brown in color.

*Example 23*

In a 1-liter round-bottom, three-necked flask equipped with a mechanical stirrer, thermometer and a reflux condenser, 185 grams (2 mols) of epichlorohydrin, 196 grams (2 mols) of maleic anhydride, 77 grams (0.33 mole) of 1,1,1,3,3-pentachloro-isopropanol and 4 grams of aluminum isopropoxide were charged and the mixture heated to 140° C. The temperature of 140° C. was maintained for 30 minutes by cooling with a water bath, after which the temperature was continued to be maintained at 140° C. with a heating mantle for a total reaction time of 2½ hours.

A quantity of this polychloroalkyl ester resin (240 grams) was mixed with 160 grams of styrene to give a mixture containing 40% styrene. 2 grams (0.5%) of benzoyl peroxide were added and a plate was cast. Cure was effected by heating at 60° C. for 16 hours followed by a post cure at 100° C. for 5 hours. The product was nonburning and clear and transparent and golden tan to brown in color.

The physical properties of the plastics prepared in Examples 11 through 23 are tabulated in Table II below.

heating at 60° C. for 16 hours followed by a post cure at 100° C. for 5 hours. This product showed the following physical properties:

Tensile strength, p.s.i. _____ 6,746
Flexural strength, p.s.i. _____ 12,810
Heat distortion temperature, ° C. _____ 114
Hardness (Barcol) _____ 38
Water absorption, percent:
    4 hrs./100° C. _____ 0.67
    24 hrs./23° C. _____ 0.228
Specific gravity _____ 1.350

Test panels kept for one month submerged in acetone showed no visible change while other panels which were kept for one month in ethylene dichloride were only slightly crazed, thus illustrating the chemical and solvent resistance of the product.

*Example 25*

A polyester was prepared exactly as described in Example 24 with the exception that in lieu of the adipoylchloride 30.5 grams (0.222 mole) of phosphorus trichloride were added and stirred one additional hour at 200° C. During this period 17.5 grams of HCl evolved from the reaction mixture indicating a 72 percent conversion of the phosphorus trichloride. No volatiles were found in the final product which exhibited a Gardner color of 10.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. This product showed the following physical properties:

Tensile strength, p.s.i. _____ 3,405
Flexural strength, p.s.i. _____ 8,541

TABLE II

| Example | Spec. Gravity | Barcol Hardness | Tensile Strength, p.s.i. | Water Absorption, percent | | Flexural Strength, p.s.i. | Heat Distortion, ° C. |
| --- | --- | --- | --- | --- | --- | --- | --- |
| | | | | 24 hrs. at R. T. | 4 hrs. at 100° C. | | |
| 11 | 1.34 | 36 | 7,603 | 0.045 | 0.57 | 11,898 | 117 |
| 12 | 1.33 | 38 | 5,516 | 0.084 | 0.66 | 14,101 | 123 |
| 13 | 1.32 | 39 | 6,810 | 0.110 | 0.82 | 14,210 | 115 |
| 14 | 1.339 | 41 | 5,514 | nil | 0.49 | 14,302 | 118 |
| 15 | 1.33 | 40 | 5,493 | 0.053 | 0.86 | 9,444 | 90.5 |
| 16 | 1.361 | 37 | 6,156 | 0.087 | 0.91 | 12,865 | 107 |
| 17 | 1.354 | 37 | 7,382 | 0.23 | 0.93 | 13,600 | 121 |
| 18 | 1.350 | 37 | 7,788 | 0.18 | 0.89 | 15,544 | 124 |
| 19 | 1.331 | 38 | 10,595 | 0.16 | 1.15 | 15,307 | 83.5 |
| 20 | | 40 | 6,886 | | 0.56 | 11,006 | 110 |
| 21 | 1.345 | 41 | 6,308 | 0.119 | 0.67 | 13,169 | 116 |
| 22 | 1.353 | 34 | 9,190 | 0.07 | 1.03 | 14,116 | 105 |
| 23 | | | 6,415 | | 1.07 | 17,273 | 110 |

*Example 24*

In a 1-liter round-bottom flask equipped with a mechanical stirrer, thermometer, heating mantle, and a water-cooled condenser, 322 grams of 3,3,3-trichloropropylene oxide (2 mols), 196 grams of maleic anhydride (2 mols), and 155 grams of 1,1,1,3,3-pentachloroisopropanol (0.67 mole), and 0.7 gram of aluminum phthalate were charged, stirred and heated to 140° C., which temperature was maintained for 6 hours. To the viscous reaction product at 140° C., 61.2 grams (0.3 mole) of adipoylchloride were added and stirred one additional hour at 200° C. During this time 23 grams of HCl evolved from the reaction mixture indicating a quantitative conversion of the adipoylchloride. The final material contained only trace amounts of volatiles and exhibited a Gardner color of 13.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by Heat distortion temperature, ° C. _____ 123
Hardness (Barcol) _____ 40
Water absorption, percent:
    4 hrs./100° C. _____ 0.971
    24 hrs./23° C. _____ 0.205
Specific gravity _____ 1.361

Test panels which were submerged in acetone and ethylene dichloride for 3 weeks were only slightly crazed, thus demonstrating the chemical and solvent resistance of the styrenated, cured polyester.

*Example 26*

A polyester prepared exactly as described in Example 24 with the exception that in lieu of the adipoylchloride 58.2 grams (0.33 mole) tolylene diisocyanate and 0.67 gram, i.e. 0.1 weight percent, of stannous octoate catalyst were added after allowing the reaction mixture to cool down to 110° C. The temperature of the stirred reaction mixture rose to 145° C. within 5 minutes and was kept at 140° C. for 30 minutes. 6.5 grams of volatiles were removed under a 1 mm. Hg vacuum and the final product exhibited a Gardner color of 12.

A quantity of this polychloroalkyl ester resin (240 grams) was mixed with 160 grams of styrene to give a mixture containing 40% styrene. 2 grams (0.5%) of benzoyl peroxide and 4 ml. (1%) of dimethylphosphite were added and a plate was cast. Cure was effected by heating at 60° C. for 16 hours followed by a post cure at 100° C. for 5 hours. This product showed the following physical properties:

| | |
|---|---|
| Tensile strength, p.s.i. | 6,533 |
| Flexural strength, p.s.i. | 14,545 |
| Heat distortion temperature, ° C. | 131 |
| Hardness (Barcol) | 36 |
| Water absorption, percent: | |
| 4 hrs./100° C. | 0.87 |
| 24 hrs./23° C. | 0.064 |
| Specific gravity | 1.347 |

It is to be understood that various changes and modifications may be made in the foregoing composition and process without departing from the spirit of the invention and scope of the appended claims.

What is claimed is:

1. A cross-linked polyester resin which is the reaction product of
(I) an ethylenically unsaturated polyester of
(1) a dicarboxylic organic anhydride selected from the group consisting of
(a) ethylenically unsaturated dicarboxylic acid anhydrides and
(b) mixtures of the ethylenically unsaturated dicarboxylic acid anhydride and a member of the group consisting of saturated dicarboxylic acid anhydrides and dicarboxylic acid anhydrides free of other than aromatic unsaturation, the total amount of ethylenically unsaturated dicarboxylic material being present in amount of at least about 40% by weight of the total amount of dicarboxylic material as defined in (b), and
(2) at least one vicinal alkylene oxide selected from the group consisting of
(a) an alkylene oxide containing from 2 to 18 carbon atoms inclusive, selected from the group consisting of saturated alkylene oxides which are free from other than aromatic unsaturation, and
(b) an alkylene oxide as defined in (a) but containing from 3 to 4 carbon atoms and at least 1 halogen atom, each halogen having from 1 to 2 alkyl groups attached to at least 1 carbon atom of the oxirane ring, said alkyl groups having up to 2 carbon atoms, and
(3) a halogenated monofunctional alcohol having the following general formula:

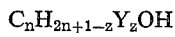

wherein $n$ is an integer of from 1 to 11, $z$ is an integer from 1 to 23, and $Y$ is a halogen having an atomic weight of 19 to 80 inclusive,
(II) an ethylenically unsaturated cross-linking agent, said cross-linked polyester being characterized by a relatively high order of non-flammability and chemical resistance.

2. The cross-linked polyester of claim 1 wherein said dicarboxylic organic anhydride (1) and said vicinal alkylene oxide (2) are in a molar ratio of about 1:1 to about 1:6, and said halogenated monofunctional alcohol (3) and said dicarboxylic anhydride (1) are in a molar ratio of about 1:1 to 1:50.

3. The cross-linked polyester of claim 2 wherein said halogenated monofunctional alcohol (3) and said dicarboxylic acid anhydride (1) are in a molar ratio of about 1:2 to 1:12.

4. The cross-linked polyester of claim 2 wherein said ethylenically unsaturated polyester (I) is cross-linked with about 20 to 50 percent by weight of styrene.

5. The cross-linked polyester of claim 4 wherein said vicinal alkylene oxide is a 3,3,3-trihalopropylene oxide.

6. The polyester of claim 4 wherein the halogenated monofunctional alcohol is a 1,1,1,3,3-pentahaloisopropanol.

7. The polyester of claim 4 wherein the vicinal alkylene oxide is a 3,3,3-trihalopropylene oxide and the halogenated monofunctional alcohol is a 1,1,1,3,3-pentahaloisopropanol.

8. A cross-linked polyester resin which is in the reaction product of
(I) a polyester of
(1) maleic anhydride,
(2) 3,3,3-trichloropropylene oxide, (1) and (2) being in a molar ratio of about 1:1 to about 1:6, and
(3) 1,1,1,3,3-pentachloroisopropanol, (3) and (1) being in a molar ratio of about 1:1 to 1:50, and
(II) an ethylenically unsaturated cross-linking agent.

9. A cross-linked polyester resin of claim 8 wherein said cross-linking agent comprises styrene.

10. A cross-linked polyester resin of claim 8 wherein said cross-linking agent comprises an alkyl methacrylate.

11. A cross-linked polyester resin of claim 8 wherein said cross-linking agent comprises styrene and butyl methacrylate.

12. A cross-linked polyester resin of claim 8 wherein said cross-linking agent comprises diallylphthalate.

13. A cross-linked polyester resin of claim 8 wheerin said cross-linking agent comprises triallylisocyanurate.

14. A cross-linked polyester resin of claim 8 wherein said cross-linking agent comprises vinyl toluene.

15. A cross-linked polyester resin which is the reaction product of
(I) an ethylenically unsaturated polyester of
(1) maleic anhydride,
(2) 3,3,3-trichloropropylene oxide,
(3) propylene oxide, the number of moles of (1) and the sum of the number of moles of (2) and (3) being in a ratio of about 1:1 to about 1:6, and
(4) 1,1,1,3,3-pentachloroisopropanol, the number of moles of (4) and the number of moles of (1) being in a ratio of about 1:1 to about 1:50, and
(II) an ethylenically unsaturated cross-linking agent.

16. A cross-linked polyester resin which is the reaction product of
(I) an ethylenically unsaturated polyester of
(1) maleic anhydride,
(2) 3,3,3-trichloropropylene oxide,
(3) 1,2-butylene oxide, the number of moles of (1) and the sum of the number of moles of (2) and (3) being in a ratio of about 1:1 to about 1:6, and
(4) 1,1,1,3,3-pentachloroisopropanol, the number of moles of (4) and the number of moles of moles of (1) being in a ratio of about 1:1 to about 1:50, and
(II) an ethylenically unsaturated cross-linking agent.

17. A cross-linked polyester resin which is the reaction product of
(I) an ethylenically unsaturated polyester of
(1) maleic anhydride,
(2) 4,4,4-trichloro-1,2-epoxybutane, the number of moles of (1) and the number of moles of (2) being in a ratio of about 1:1 to about 1:6, and
(3) 1,1,1,3,3,-pentachloroisopropanol, the number of moles of (3) and the number of moles of (1) being in a ratio of about 1:1 to about 1:50, and (II) an ethylenically unsaturated cross-linking agent.

18. A cross-linked polyester resin which is the reaction product of
(I) an ethylenically unsaturated polyester of
(1) maleic anhydride,
(2) epichlorohydrin, the number of moles of (1) and the number of moles of (2) being in the ratio of about 1:1 to about 1:6, and
(3) 1,1,1,3,3-pentachloroisopropanol, the number of moles of (3) and the number of moles of (1) being in a ratio of about 1:1 to about 1:50, and (II) an ethylenically unsaturated cross-linking agent.

19. A cross-linked polyester resin which is the reaction product of
(I) an ethylenically unsaturated polyester of
(1) maleic anhydride,
(2) phthalic anhydride,
(3) 3,3,3-trichloropropylene oxide, the sum of the number of moles of (1) and (2) and the number of moles of (3) being in a ratio of about 1:1 to about 1:6, and
(3) 1,1,1,3,3-pentachloroisopropanol, the number of moles of (4) and the sum of the number of moles of (1) and (2) being in a ratio of about 1:1 to about 1:50, and (II) an ethylenically unsaturated cross-linking agent.

20. A cross-linked polyester resin which is the reaction product of
(I) an ethylenically unsaturated polyester of
(1) maleic anhydride,
(2) phthalic anhydride,
(3) 3,3,3-trichloropropylene oxide, the sum of the number of moles of (1) and (2) and the number of moles of (3) being in a ratio of about 1:1 to about 1:6, and
(4) 1,1,1 - trichloro - 2 - propanol, the number of moles of (4) and the sum of the number of moles of (1) and (2) being in a ratio of about 1:1 to about 1:50, and (II) an ethylenically unsaturated cross-linking agent.

21. A cross-linked polyester resin which is the reaction product of
(I) an ethylenically unsaturated polyester of
(1) citraconic anhydride,
(2) 3,3,3-trichloropropylene oxide, the number of moles of (1) and the number of moles of (2) being in a ratio of about 1:1 to about 1:6, and
(3) 1,1,1,3,3-pentachloroisopropanol, the number of moles of (3) and the number of moles of (1) being in a ratio of about 1:1 to about 1:50, and (II) an ethylenically unsaturated cross-linking agent.

22. A cross-linked polyester resin which is the reaction product of
(I) an ethylenically unsaturated polyester of
(1) succinic anhydride,
(2) citraconic anhydride,
(3) 3,3,3-trichloropropylene oxide, the sum of the number of moles of (1) and (2) and the number of moles of (3) being in a ratio of about 1:1 to about 1:6, and
(4) 1,1,1,3,3-pentachloroisopropanol, the number of moles of (4) and sum of the number of moles of (1) and (2) being in a ratio of about 1:1 to about 1:50, and (II) an ethylenically unsaturated cross-linking agent.

23. A cross-linked polyester resin which is the reaction product of
(I) an ethylenically unsaturated polyester of
(1) maleic anhydride,
(2) 3,3,3-trichloropropylene oxide, the number of moles of (1) and the number of moles of (2) being in a ratio of about 1:1 to about 1:6, and
(3) 1,1,1-trichloro-2-propanol, the number of moles of (3) and the number of moles of (1) being in a ratio of about 1:1 to about 1:50, and (II) an ethylenically unsaturated cross-linking agent.

24. A cross-linked polyester resin which is the reaction product of
(I) an ethylenically unsaturated polyester of
(1) maleic anhydride,
(2) 3,3,3-trichloropropylene oxide, the number of moles of (1) and the number of moles of (2) being in a ratio of about 1:1 to about 1:6, and
(3) 2,2,2-trichloroethanol, the number of moles of (3) and the number of moles of (1) being in a ratio of about 1:1 to about 1:50, and (II) an ethylenically unsaturated cross-linking agent.

25. A cross-linked polyester resin which is the reaction product of
(I) an ethylenically unsaturated polyester of
(1) maleic anhydride,
(2) 3,3,3-trichloropropylene oxide, the number of moles of (1) and the number of moles of (2) being in a ratio of about 1:1 to about 1:6, and
(3) 1,1,3-trichloroisopropanol, and
(4) 1,3-dichloroisopropanol, the sum of the number of moles of (3) and (4) and the number of moles of (1) being in a ratio of from about 1:1 to about 1:50, and (II) an ethylenically unsaturated cross-linking agent.

26. A process for preparing a cross-linked polyester resin comprising reacting
(I) an ethylenically unsaturated polyester of
(1) a dicarboxylic organic anhydride selected from the group consisting of
(a) ethylenically unsaturated dicarboxylic acid anhydrides and
(b) mixtures of the ethylenically unsaturated dicarboxylic acid anhydrides and a member of the group consisting of saturated dicarboxylic acid anhydrides and dicarboxylic acid anhydrides free of other than aromatic unsaturation, the total amount of ethylenically unsaturated dicarboxylic material being present in amount of at least about 40% by weight of the total amount of dicarboxylic material as defined in (b) and
(2) at least one vicinal alkylene oxide selected from the group consisting of
(a) an alkylene oxide containing from 2 to 18 carbon atoms inclusive, selected from the group consisting of saturated alkylene oxides and alkylene oxides which are free from other than aromatic unsaturation, and
(b) an alkylene oxide as defined in (a) but containing from 3 to 4 carbon atoms and at least 1 halogen atom, each halogen having an atomic weight of 19 to 80 inclusive and having from 1 to 2 alkyl groups attached attached to a carbon atom of the oxirane ring, said alkyl groups having up to 2 carbon atoms, and
(3) a halogenated monofunctional alcohol having the following general formula:

$$C_nH_{2n+1-z}Y_zOH$$

wherein $n$ is an integer of from 1 to 11, $z$ is an integer from 1 to 23, and Y is a halogen having an atomic weight of 19 to 80 inclusive in the presence of a reaction catalyst and (II) an ethylenically unsaturated cross-linking agent in the presence of a vinyl polymerization initiator.

27. The process of claim 26 wherein said organic dicarboxylic acid anhydride (1) and said vicinal alkylene oxide (2) are reacted in a molar ratio of about 1:1 to about 1:6, said halogenated monofunctional alcohol (3) and said dicarboxylic acid anhydride are reacted in a molar ratio of about 1:1 to 1:50 and the amount of said reaction catalyst is from about 0.01 to 10 percent by weight of the total mixture.

28. The process of claim 27 wherein the halogenated monofunctional alcohol and the dicarboxylic acid anhydride are reacted in a molar ratio of about 1:2 to 1:12 and said catalyst is present in an amount of about 0.1 to 0.5 percent of the total ingredients.

29. The process for preparing a cross-linked polyester of claim 27 wherein the ethylenically unsaturated polyester (I) is cross-linked with about 20 to 50 percent by weight of styrene.

30. The process for preparing a cross-linked polyester of claim 29 wherein the vicinal alkylene oxide is a 3,3,3-trihalopropylene oxide.

31. The process for preparing a cross-linked polyester of claim 29 wherein the halogenated monofunctional alcohol is a 1,1,1,3,3-pentahaloisopropanol.

32. The process for preparing a polyester of claim 29 wherein the alkylene oxide is a 3,3,3-trihalopropylene oxide and the halogenated monofunctional alcohol is 1,1,1,-3,3-pentahaloisopropanol.

33. The process of claim 29 wherein the reaction catalyst is aluminum isopropoxide.

34. The process of claim 29 wherein the reaction catalyst is aluminum chloride.

35. The process of claim 29 wherein the reaction catalyst is aluminum phthalate.

36. A process for preparing a cross-linked polyester resin comprising reacting
(I) an ethylenically unsaturated polyester of
(1) maleic anhydride,
(2) 3,3,3-trichloropropylene oxide, (1) and (2) being in a molar ratio of about 1:1 to about 1:6, and
(3) 1,1,1,3,3-pentachloroisopropanol (3) and (1) being in a molar ratio of about 1:1 to about 1:50 and
(II) an ethylenically unsaturated cross-linking agent in the presence of a vinyl polymerization initiator.

37. A process of claim 36 wherein said cross-linking agent comprises styrene.

38. A process of claim 36 wherein said cross-linking agent comprises an alkyl methacrylate.

39. A process of claim 36 wherein said cross-linking agent comprises styrene and butyl methacrylate.

40. A process of claim 36 wherein said cross-linking agent comprises diallylphthalate.

41. A process of claim 36 wherein said cross-linking agent comprises triallylisocyanurate.

42. A process of claim 36 wherein said cross-linking agent comprises vinyl toluene.

43. A process for preparing a cross-linked polyester resin comprising reacting
(I) an ethylenically unsaturated polyester of
(1) maleic anhydride,
(2) 3,3,3-trichloropropylene oxide,
(3) propylene oxide, the number of moles of (1) and the sum of the number of moles of (2) and (3) being in a ratio of about 1:1 to about 1:6, and
(4) 1,1,1,3,3-pentachloroisopropanol, the number of moles of (4) and the number of moles of (1) being in a ratio of about 1:1 to about 1:50, and
(II) an ethylenically unsaturated cross-linking agent in the presence of a vinyl polymerization initiator.

44. A process for preparing a cross-linked polyester resin comprising reacting
(I) an ethylenically unsaturated polyester of
(1) maleic anhydride,
(2) 3,3,3-trichloropropylene oxide,
(3) 1,2-butylene oxide, the number of moles of (1) and the sum of the number of moles of (2) and (3) being in a ratio of about 1:1 to about 1:6, and
(4) 1,1,1,3,3-pentachloroisopropanol, the number of moles of (4) and the number of moles of (1) being in a ratio of about 1:1 to about 1:50, and
(II) an ethylenically unsaturated cross-linking agent in the presence of a vinyl polymerization initiator.

45. A process for preparing a cross-linked polyester resin comprising reacting
(I) an ethylenically unsaturated polyester of
(1) maleic anhydride,
(2) 4,4,4-trichloro-1,2-epoxybutane, the number of moles of (1) and the number of moles of (2) being in a ratio of about 1:1 to about 1:6, and
(3) 1,1,1,3,3,-pentachloroisopropanol, the number of moles of (3) and the number of moles of (1) being in a ratio of about 1:1 to about 1:50, and
(II) an ethylenically unsaturated cross-linking agent in the presence of vinyl polymerization initiator.

46. A process for preparing a cross-linked polyester resin which is the reaction product of
(I) an ethylencially unsaturated polyester of
(1) maleic anhydride,
(2) epichlorohydrin, the number of moles of (1) and the number of moles of (2) being in the ratio of about 1:1 to about 1:6, and
(3) 1,1,1,3,3-pentachloroisopropanol, the number of moles of (3) and the number of moles of (1) being in a ratio of about 1:1 to about 1:50, and
(II) an ethylenically unsaturated cross-linking agent in the presence of a vinyl polymerization initiator.

47. A process for preparing a cross-linked polyester resin comprising reacting
(I) an ethylenically unsaturated polyester of
(1) maleic anhydride,
(2) phthalic anhydride,
(3) 3,3,3-trichloropropylene oxide, the sum of the the number of moles of (1) and (2) and the number of moles of (3) being in a ratio of about 1:1 to about 1:6, and
(4) 1,1,1,3,3-pentachloroisopropanol, the number of moles of (4) and the sum of the number of moles of (1) and (2) being in a ratio of about 1:1 to about 1:50, and
(II) an ethylenically unsaturated cross-linking agent in the presence of a vinyl polymerization initiator.

48. A process for preparing a cross-linked polyester resin comprising reacting
(I) an ethylenically unsaturated polyester of
(1) maleic anhydride,
(2) phthalic anhydride,
(3) 3,3,3-trichloropropylene oxide, the sum of the number of moles of (1) and (2) and the number of moles of (3) being in a ratio of about 1:1 to about 1:6, and
(4) 1,1,1-trichloro-2-propanol, the number of moles of (4) and the sum of the number of moles of (1) and (2) being in a ratio of about 1:1 to about 1:50, and
(II) an ethylenically unsaturated cross-linking agent in the presence of a vinyl polymerization initiator.

49. A process for preparing a cross-linked polyester resin comprising reacting
(I) an ethylencially unsaturated polyster of
(1) citraconic anhydride,
(2) 3,3,3-trichloropropylene oxide, the number of moles of (1) and the number of moles of (2) being in a ratio of about 1:1 to about 1:6, and (3) 1,1,1,3,3,-pentachloroisopropanol, the number of moles of (3) and the number of moles of (1) being in a ratio of about 1:1 to about 1:50, and (II) an ethylenically unsaturated cross-linking agent in the presence of a vinyl polymerization initiator.

50. A process of preparing a cross-linked polyester resin comprising reacting
(I) an ethylenically unsaturated polyester of
(1) succinic anhydride,
(2) citraconic anhydride,
(3) 3,3,3-trichloropropylene oxide, the sum of the number of moles of (1) and (2) and the number of moles of (3) being in a ratio of about 1:1 to about 1:6, and
(4) 1,1,1,3,3-pentachloroisopropanol, the number of moles of (4) and the sum of the number of moles of (1) and (2) being in ratio of about 1:1 to about 1:50, and
(II) an ethylenically unsaturated cross-linking agent in the presence of a vinyl polymerization initiator.

51. A process of preparing a cross-linked polyester resin comprising reacting
(I) an ethylenically unsaturated polyester of
(1) maleic anhydride,
(2) 3,3,3-trichloropropylene oxide, the number of moles of (1) and the number of moles of (2) being in a ratio of about 1:1 to about 1:6, and
(3) 1,1,1,-trichloro-2-propanol, the number of moles of (3) and the number of moles of (1) being in a ratio of about 1:1 to about 1:50, and
(II) an ethylenically unsaturated cross-linking agent in the presence of a vinyl polymerization initiator.

52. A process of preparing a cross-linked polyester resin comprising reacting
(I) an ethylenically unsaturated polyster of
(1) maleic anhydride,
(2) 3,3,3-trichloropropylene oxide, the number of moles of (1) and the number of moles of (2) being in a ratio of about 1:1 to about 1:6, and
(3) 2,2,2-trichloroethanol, the number of moles of (3) and the number of moles of (1) being in a ratio of about 1:1 to about 1:50, and
(II) an ethylenically unsaturated cross-linking agent in the presence of a vinyl polymerization initiator.

53. A process of preparing a cross-linked polyester resin comprising reacting
(I) an ethylenically unsaturated polyester of
(1) maleic anhydride,
(2) 3,3,3-trichloropropylene oxide, the number of moles of (1) and the number of moles of (2) being in a ratio of about 1:1 to about 1:6, and
(3) 1,1,3-trichloroisopropanol, and
(4) 1,3-dichloroisopropanol, the sum of the number of moles of (3) and (4) and the number of moles of (1) being in a ratio of from about 1:1 to about 1:50, and
(II) an ethylenically unsaturated cross-linking agent in the presence of a vinyl polymerization initiator.

54. A cross-linked polyester which is the reaction product of an ethylenically unsaturated cross-linking agent (II), an unsaturated polyester (I), said unsaturated polyester (I) having a molecular weight between about 200 and 10,000, and a structure depicted by the following formula:

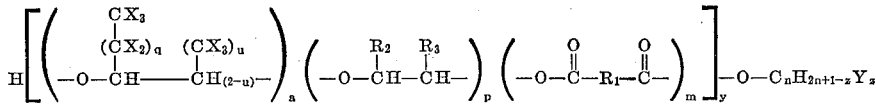

wherein $R_1$ is the residue of the dibasic anhydride, $R_2$ and $R_3$ are aliphatic or aromatic radicals or hydrogen, Y is a halogen, X is hydrogen or halogen, $q$ and $u$ are 0 to 1, $m$ is an integer 1, $y$ is an integer from 1 to 50 inclusive, $n$ is an integer from 1 to 11 inclusive, $z$ is an integer from 1 to 23 inclusive, and $a$ and $p$ are selected from 0, 1, 2 and 3.

55. A cross-linked polyester resin which is the reaction product of
(I) an ethylenically unsaturated polyester of
(A) (1) a dicarboxylic organic anhydride selected from the group consisting of
(a) ethylenically unsaturated dicarboxylic acid anhydrides and
(b) mixtures of ethylenically unsaturated dicarboxylic acid anhydride and a member of the group consisting of saturated dicarboxylic acid anhydrides and dicarboxylic acid anhydrides free of other than aromatic unsaturation, the total amount of ethylenically unsaturated dicarboxylic material being present in amount of at least about 40 percent by weight of the total amount of dicarboxylic material as defined in (b), and
(2) at least one vicinal alkylene oxide selected from the group consisting of
(a) an alkylene oxide containing from 2 to 18 carbon atoms inclusive, selected from the group consisting of saturated alkylene oxides and alkylene oxides which are free from other than aromatic unsaturation, and
(b) an alkylene oxide as defined in (a) but containing from 3 to 4 carbon atoms and at least 1 halogen atom, each halogen having an atomic weight of 19 to 80 inclusive and having from 1 to 2 alkyl groups attached to at least 1 carbon atom of the oxirane ring, said alkyl groups having up to 2 carbon atoms, and
(3) a halogenated monofunctional alcohol having the following general formula:

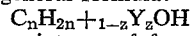

wherein $n$ is an integer of from 1 to 11, $z$ is an integer from 1 to 23, and Y is a halogen having an atomic weight of 19 to 80 inclusive, and
(B) a compound selected from the group consisting of isocyanates, and inorganic and organic acid chloride, and
(II) an ethylenically unsaturated cross-linking agent, said cross-linked polyester being characterized by a relatively high order of non-flammability and chemical resistance.

56. The reaction product of claim 55 wherein said compound B is adipoylchloride.

57. The reaction product of claim 55 wherein said compound B is phosphorous trichloride.

58. The reaction product of claim 55 wherein said compound B is tolylene diisocyanate.

59. The product of claim 55 wherein said organic dicarboxylic acid anhydride and said vicinal alkylene oxide are in a molar ratio of about 1:1 to about 1:6, said halogenated monofunctional alcohol and said dicarboxylic acid anhydride are in a molar ratio of about 1:1 to 1:50, and said compound B is added in an amount equivalent to the OH—content of compound A.

60. The reaction product of
(I) a polyester of
(A) (1) maleic anhydride,
(2) a 3,3,3-trihalopropylene oxide, and
(3) a 1,1,1,3,3-pentahaloisopropanol, and
(B) adipoylchloride, and (II) an ethylenically unsaturated cross-linking agent.
61. The reaction product of
(I) a polyester of
  (A) (1) maleic anhydride,
    (2) a 3,3,3-trihalopropylene oxide, and
    (3) a 1,1,1,3,3-pentahaloisopropanol, and
  (B) phosphorous trichloride, and
(II) an ethylenically unsaturated cross-linking agent.
62. The reaction product of
(I) a polyester of
  (A) (1) maleic anhydride,
    (2) a 3,3,3-trihalopropylene oxide, and
    (3) a 1,1,1,3,3-pentahaloisopropanol, and
  (B) tolylene diisocyanate, and
(II) an ethylenically unsaturated cross-linking agent.
63. A process for preparing a cross-linked polyester resin comprising reacting
(I) an ethylenically unsaturated polyester of
  (A)(1) a dicarboxylic organic anhydride selected from the group consisting of
    (a) ethylenically unsaturated dicarboxylic acid anhydrides and
    (b) mixtures of ethylenically unsaturated dicarboxylic acid anhydride and a member of the group consisting of saturated dicarboxylic acid anhydrides and dicarboxylic acid anhydrides free of other than aromatic unsaturation, the total amount of ethylenically unsaturated dicarboxylic material being present in amount of at least about 40 percent by weight of the total amount of dicarboxylic material as defined in (b), and
  (2) at least one vicinal alkylene oxide selected from the group consisting of
    (a) an alkylene oxide containing from 2 to 18 carbon atoms inclusive, selected from the group consisting of saturated alkylene oxides and alkylene oxides which are free from other than aromatic unsaturation, and
    (b) an alkylene oxide as defined in (a) but containing from 3 to 4 carbon atoms and at least 1 halogen atom, each halogen having an atomic weight of 19 to 80 inclusive and having from 1 to 2 alkyl groups attached to at least 1 carbon atom of the oxirane ring, said alkyl groups having up to 2 carbon atoms, and
  (3) a halogenated monofunctional alcohol having the following general formula:

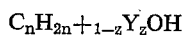

wherein $n$ is an integer of from 1 to 11, $z$ is an integer from 1 to 23, and Y is halogen having an atomic weight of 19 to 80 inclusive, at a temperature sufficient to maintain said polyester above the solidification point, and
  (B) a compound selected from the group consisting of isocyanates and inorganic and organic acid chlorides, and
(II) an ethylenically unsaturated cross-linking agent in the presence of a vinyl polymerization initiator.
64. The process of claim 63 wherein said compound B is adipoylchloride.
65. The process of claim 63 wherein said compound B is phosphorus trichloride.
66. The process of claim 63 wherein said compound B is tolylene diisocyanate.
67. The process of claim 63 wherein said organic dicarboxylic acid anhydride and said vicinal alkylene oxide are in a molar ratio of about 1:1 to about 1:6, said halogenated monofunctional alcohol and said dicarboxylic acid anhydride are in a molar ratio of about 1:1 to 1:50 and said compound B is added in an amount equivalent to the OH— content of the polyester.
68. A process for preparing a cross-linked polyester resin comprising reacting
(I) a polyester of
  (A)(1) maleic anhydride,
    (2) a 3,3,3-trihalopropylene oxide, and
    (3) a 1,1,1,3,3-pentahaloisopropanol, and
  (B) adipoylchloride, and
(II) an ethylenically unsaturated cross-linking agent in the presence of a vinyl polymerization initiator.
69. A process for preparing a cross-linked polyester resin comprising reacting
(I) a polyester of
  (A)(1) maleic anhydride,
    (2) a 3,3,3-trihalopropylene oxide, and
    (3) a 1,1,1,3,3-pentahaloisopropanol, and
  (B) phosphorous trichloride, and
(II) an ethylenically unsaturated cross-linking agent in the presence of a vinyl polymerization initiator.
70. A process for preparing a cross-linked polyester resin comprising reacting
(I) a polyester of
  (A)(1) maleic anhydride,
    (2) a 3,3,3-trihalopropylene oxide, and
    (3) a 1,1,1,3,3-pentahaloisopropanol, and
  (B) tolylene diisocyanate, and
(II) an ethylenically unsaturated cross-linking agent in the presence of a vinyl polymerization initiator.

No references cited.

MURRAY TILLMAN, *Primary Examiner.*

J. T. GOOLKASIAN, *Assistant Examiner.*